United States Patent
Lee et al.

(10) Patent No.: US 10,347,246 B2
(45) Date of Patent: Jul. 9, 2019

(54) METHOD AND APPARATUS FOR EXECUTING A USER FUNCTION USING VOICE RECOGNITION

(71) Applicant: Samsung Electronics Co., Ltd., Gyeonggi-do (KR)

(72) Inventors: Dongyeol Lee, Gyeonggi-do (KR); Sehwan Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 31 days.

(21) Appl. No.: 13/739,637

(22) Filed: Jan. 11, 2013

(65) Prior Publication Data

US 2013/0179173 A1    Jul. 11, 2013

(30) Foreign Application Priority Data

Jan. 11, 2012   (KR) .......................... 10-2012-0003502

(51) Int. Cl.

| | |
|---|---|
| *G10L 15/26* | (2006.01) |
| *G10L 15/22* | (2006.01) |
| *G06F 3/16* | (2006.01) |
| *G06F 3/0487* | (2013.01) |
| *G06F 3/0482* | (2013.01) |
| *G10L 15/00* | (2013.01) |
| *G06F 9/451* | (2018.01) |

(52) U.S. Cl.
CPC ............ *G10L 15/22* (2013.01); *G06F 3/0482* (2013.01); *G06F 3/0487* (2013.01); *G06F 3/167* (2013.01); *G06F 9/453* (2018.02); *G10L 15/00* (2013.01); *G10L 15/26* (2013.01); *G10L 2015/223* (2013.01)

(58) Field of Classification Search
CPC ................................ G10L 15/00; G10L 15/26
USPC .......... 704/246, 251, 257, 270, 275, E15.001
See application file for complete search history.

(56) References Cited

U.S. PATENT DOCUMENTS

| | | | |
|---|---|---|---|
| 5,386,564 A | | 1/1995 | Shearer et al. |
| 5,874,939 A | * | 2/1999 | Galvin ................... G06F 3/023 |
| | | | 345/156 |

(Continued)

FOREIGN PATENT DOCUMENTS

| | | |
|---|---|---|
| CN | 1410298 | 4/2003 |
| CN | 1592295 | 3/2005 |

(Continued)

OTHER PUBLICATIONS

Japanese Office Action dated Nov. 7, 2016 issued in counterpart application No. 2013-003385, 7 pages.

(Continued)

*Primary Examiner* — Feng-Tzer Tzeng
(74) *Attorney, Agent, or Firm* — The Farrell Law Firm, P.C.

(57) ABSTRACT

A method and an apparatus for executing a user function using voice recognition. The method includes displaying a user function execution screen; confirming a function to be executed according to voice input; displaying a voice command corresponding to the confirmed function on the user function execution screen; recognizing a voice input by a user, while a voice recognition execution request is continuously received; and executing the function associated with the input voice command, when the recognized voice input is at least one of the displayed voice command.

23 Claims, 11 Drawing Sheets

(56) References Cited

U.S. PATENT DOCUMENTS

| | | | |
|---|---|---|---|
| 5,884,265 A | | 3/1999 | Squitteri et al. |
| 5,890,122 A | | 3/1999 | Van Kleeck et al. |
| 6,424,357 B1 | * | 7/2002 | Frulla .................. G06F 3/038 |
| | | | 715/716 |
| 6,762,692 B1 | | 7/2004 | Mingot et al. |
| 7,461,352 B2 | * | 12/2008 | Katsuranis .................. 715/800 |
| 7,613,616 B2 | | 11/2009 | Luisi |
| 8,275,617 B1 | * | 9/2012 | Morgan et al. ............... 704/251 |
| 8,543,397 B1 | * | 9/2013 | Nguyen ............. G06F 3/04883 |
| | | | 704/235 |
| 2002/0055844 A1 | | 5/2002 | L'Esperance et al. |
| 2002/0169616 A1 | * | 11/2002 | Brooks .................. G06F 3/038 |
| | | | 704/275 |
| 2003/0009330 A1 | | 1/2003 | Cho |
| 2004/0119754 A1 | | 6/2004 | Bangalore et al. |
| 2005/0050138 A1 | | 3/2005 | Creamer et al. |
| 2005/0114140 A1 | | 5/2005 | Brackett et al. |
| 2005/0239487 A1 | * | 10/2005 | Glass .................. H04W 72/005 |
| | | | 455/519 |
| 2007/0055520 A1 | * | 3/2007 | Mowatt et al. ............... 704/251 |
| 2008/0059195 A1 | * | 3/2008 | Brown ........................ 704/270 |
| 2008/0133244 A1 | | 6/2008 | Bodin et al. |
| 2009/0150785 A1 | * | 6/2009 | Asami .................. G06F 3/038 |
| | | | 715/727 |
| 2009/0182562 A1 | | 7/2009 | Caire et al. |
| 2009/0253463 A1 | | 10/2009 | Shin et al. |
| 2010/0273529 A1 | | 10/2010 | Oh et al. |
| 2010/0312547 A1 | * | 12/2010 | Van Os .................. G10L 15/26 |
| | | | 704/9 |
| 2012/0209608 A1 | * | 8/2012 | Lee .................. G10L 15/22 |
| | | | 704/246 |

FOREIGN PATENT DOCUMENTS

| | | | | |
|---|---|---|---|---|
| CN | 101911146 | | 12/2010 | |
| DE | 10028869 | | 1/2001 | |
| EP | 2 109 295 | | 10/2009 | |
| EP | 2717121 | * | 5/2014 | .......... G06F 3/0484 |
| FR | 2 783 625 | | 3/2000 | |
| JP | 2002-525690 | | 8/2002 | |
| JP | 2011-511935 | | 4/2011 | |
| KR | 1020010015934 | | 3/2001 | |
| KR | 1020060030665 | | 4/2006 | |
| KR | 1020100116462 | | 11/2010 | |
| KR | 10-1048321 | | 7/2011 | |
| WO | WO 2010/141802 | | 12/2010 | |
| WO | WO 2014017876 | * | 1/2014 | ............. G10L 15/22 |

OTHER PUBLICATIONS

Chinese Office Action dated Nov. 30, 2016 issued in counterpart application No. 201310011801.3, 26 pages.
European Search Report dated Nov. 24, 2017 issued in counterpart application No. 17196474.5-1914, 12 pages.
Chinese Office Action dated Mar. 21, 2018 issued in counterpart application No. 2013100118013, 30 pages.
Korean Office Action dated Oct. 24, 2018 issued in counterpart application No. 10-2012-0003502, 9 pages.

* cited by examiner

METHOD AND APPARATUS FOR EXECUTING A USER FUNCTION USING VOICE RECOGNITION

PRIORITY

This application claims priority under 35 U.S.C. § 119(a) to Korean Patent Application Serial No. 10-2012-0003502, which was filed on Jan. 11, 2012 in the Korean Intellectual Property Office, the entire disclosure of which is hereby incorporated by reference.

BACKGROUND OF THE INVENTION

1. Field of the Invention

The present invention relates generally to a method and an apparatus for executing a user function using voice recognition.

2. Description of the Related Art

Voice recognition technology may be implemented in various electronic devices such as smart phones, televisions, car navigation devices, etc.

Generally, voice recognition technology classifies an input voice in a statistic analysis scheme, wherein, for exact voice recognition, a complex statistic model and a large capacity voice recognition database are required. Consequently, to support voice recognition, a large amount of computation resources and a large memory are utilized in an electronic device.

However, conventional electronic devices that support voice recognition do not satisfy the high performance computation ability and large memory requirements, due to limitations such as cost, size, and portability. Accordingly, there are various limitations on the accuracy and processing speed of voice recognition in the conventional electronic devices.

SUMMARY OF THE INVENTION

The present invention has been made in view of the above-described problems occurring in the prior art, and provides at least the advantages described below.

Accordingly, an aspect of the present invention is to provide a method and apparatus for executing a user function through voice recognition by outputting an executable voice command.

Another aspect of the present invention is to provide a method and apparatus for a user to easily confirm an executable voice command.

In accordance with an aspect of the present invention, a method for executing a user function by an electronic device is provided. The method includes displaying a user function execution screen; confirming a function to be executed according to voice input; displaying a voice command corresponding to the confirmed function on the user function execution screen; recognizing a voice input by a user, while a voice recognition execution request is continuously received; and executing the function associated with the input voice command, when the displayed voice command is voice input, based on the recognized voice input.

In accordance with another aspect of the present invention, an apparatus for executing a user function is provided. The apparatus includes a display unit that displays a user function execution screen; an input unit that enters a voice recognition execution request when pressed; an audio processor that collects and records voice input; and a controller that receives the voice recognition execution request from the input, confirms a function executed according to the voice input, and controlling the display unit to display a voice command corresponding to the confirmed function on the user function execution screen, while the voice recognition execution request is being received, recognizing the voice input, and executing the function associated with an input voice command, when the displayed voice command is input, based on the recognized voice input.

In accordance with another aspect of the present invention, a voice recognition system is provided, which includes an application layer configured by applications providing an object; and a user interface framework for outputting a user execution screen configured by the object collected from the application layer, searching a voice command associated with the object from stored voice commands, when a screen is switched to the execution screen to determine a candidate voice recognizable command while displaying the execution screen, and transferring the determined candidate voice recognizable command to a voice recognition engine.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

Herein, the term "user function" refers to a function executed according to an input signal generated by a predetermined input, e.g., a voice command, according to a user request.

Figure 1:
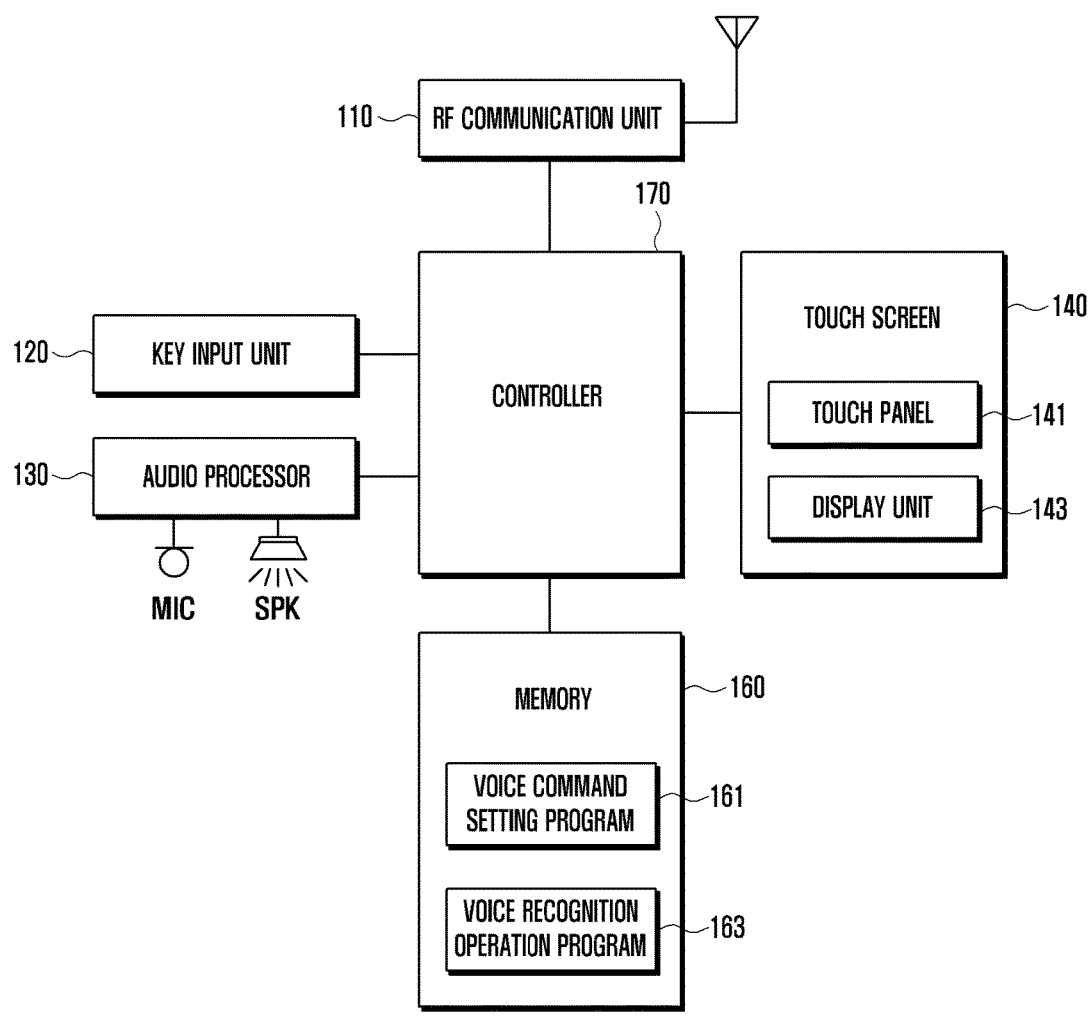
FIG. 1 is a block diagram illustrating a terminal according to an embodiment of the present invention.

FIG. 1 is a block diagram illustrating a terminal according to an embodiment of the present invention.

For example, the terminal may include a mobile device such as a Portable Multimedia Player (PMP), a digital broadcasting player, a Personal Digital Assistant (PDA), a music file player (e.g., MP3 player), a portable game terminal, a tablet Personal Computer (PC), and a Smart Phone, or an electronic device such as a vehicle navigation device, a television, a refrigerator, and a washing machine, which support voice recognition.

Referring to FIG. 1, the terminal includes a Radio Frequency (RF) communication unit 110, a key input unit 120, an audio processor 130, a touch screen 140, a memory 160, and a controller 170. Herein, the term "unit" refers to a hardware device or a combination of a hardware device and software.

The RF communication unit 110 forms a communication channel for a voice call, a communication channel for an image call, and a data communication channel for transmitting data such as images or messages, under control of the controller 170. For example, the RF communication unit 110 may receive a voice command list for a user function to be executed according to voice input. The voice command list is referred to by the controller 170 to display a voice command.

Additionally, the RF communication unit 110 receives a voice recognition execution request for a voice recognition mode through the data communication channel. When voice recognition is executed, but reception of a voice recognition execution request stops, while the voice recognition execution request is being received, the controller 170 terminates the voice recognition. Basically, the controller 170 determines a start and a termination of the voice recognition mode, based on a reception of the voice recognition execution request.

The key input unit 120 includes a plurality of input keys and function keys for receiving input of numeric or character information, and for setting various functions. For example, the function keys may include arrow keys, side keys, hot keys, etc.

Further, the key input unit 120 generates a key signal associated with a user setting and a function control of the terminal, and transfers the generated key signal to the controller 170.

When the touch screen 140 of the terminal is supported as a full touch screen, the key input unit 120 may include side keys, a home key, and other function keys provided at a side of a case of the terminal. In particular, the key input unit 120 of the present invention may include voice recognition function key set, with which a voice recognition function is executed.

Further, the key input unit 120 may transfer a voice recognition function key event generated from a voice recognition function key of voice recognition function key set to the controller 170. The controller 170 then determines the start and termination of the voice recognition mode, according to the request signal of the voice recognition function key.

The audio processor 130 includes a speaker (SPK) for outputting audio data, e.g., received during a call or from audio files stored in the memory 160, and a microphone (MIC) for collecting a voice of a user or other audio signals. More specifically, the audio processor 130 drives the MIC in a voice recognition mode in order to record a voice of the user collected through the MIC, under control of the controller 170. Further, the audio processor 130 transfers the recorded voice to the controller 170, which performs voice recognition with respect to the recorded voice. When the voice recognition mode starts or is terminated, the audio processor 130 may output a corresponding sound effect through the SPK.

The touch screen 140 includes a touch panel 141 and a display unit 143. The touch panel 141 is provided in front of the display unit 143. The size of the touch screen 140 may be determined as the size of the touch panel 141. Further, the touch screen 140 displays a screen according to an execution of a user function and senses a touch event associated with control of the user function.

The touch panel 141 is provided in at least one of upper and lower portions of the display unit 143, and a sensor of the touch panel 141 is disposed in a matrix pattern. Accordingly, the touch panel 141 generates a touch event according to contact or an approach distance of a touched object on the touch panel 141, and transfers the generated touch event to the controller 170. For example, the touch event includes a touch type and location information.

The touch panel 140 generates an event (hereinafter referred to as "a voice recognition touch event") for executing the voice recognition mode. For example, when the user touches a certain image, e.g., an icon, of a user function execution screen output through the touch panel 140, the touch panel 140 transfers a voice recognition touch event to the controller 170.

When a touch event is generated in a location corresponding to an icon display region, a function associated the icon is executed. When the voice recognition touch event is first received, e.g., when the user touches a voice recognition icon, the controller 170 starts a voice recognition mode and controls the display unit 143 to output at least one voice command for executing a function associated with a certain object, while the voice recognition touch event is being received, i.e., while the user continues to touch the voice recognition icon. When reception of the voice recognition touch event stops, i.e., the user stops touching the voice recognition icon, the controller 117 terminates the voice recognition mode.

The display unit 143 displays information input by the user, information provided to the user, various menus of the terminal, etc. Accordingly, the display unit 143 provides an execution screen of various user functions based on the intended use of the terminal.

The display unit 143 may be configured by a Liquid Crystal Display (LCD) or an Organic Light Emitted Diode (OLED). Further, the display unit 143 may be provided at an upper part or a lower part of the touch panel 141. Additionally, the display unit 143 may add a voice command to a user function execution screen being output and display the added user function execution screen.

The memory 160 stores at least one application for a function operation, user data generated by the user, messages transceived with a network, and data according to execution of the application. For example, the memory 160 may include a program area and a data area.

The program area may store an Operating System (OS) for booting the terminal and for operating the foregoing components, and downloaded and installed applications. The program area of the present invention may further store a voice command setting program 161 and a voice recognition operation program 163.

The voice command setting program 161 include routines for displaying the voice command. For example, the voice command setting program 161 includes a routine for confirming functions executed according to voice input, a routine for determining voice commands by the confirmed functions, and a routine for registering the determined voice commands. The voice command setting program 161 may further include a voice command display scheme setting routine.

The voice command setting program 161 may further include a routine for testing similarities of voice commands, before registering a voice command, and a routine for changing similar voice commands according to the similarity testing result.

The voice command setting program 161 may be executed according to a request of a voice recognition operation program 163 before a display time point of the voice command. Further, the voice command setting program 161 may be executed according to a user request.

The voice recognition operation program 163 executes the user function using voice recognition. The voice recognition operation program 163 includes a routine for executing a voice recognition function simultaneously with displaying a voice command on an execution screen, while a preset voice recognition execution request is received. The routine may be set such that a voice command is display according to a preset display scheme when the voice command is displayed. For example, the voice recognition execution request may be a voice recognition key input event received by the key input unit 120 or a voice recognition touch event received by the touch panel.

Further, the voice recognition operation system 163 includes a routine for removing a voice command from an execution screen and terminating a voice recognition function, when reception of a voice recognition execution request stops. The voice recognition operation system 163 includes a routine for executing a corresponding function when one of the voice commands displayed, based on a voice recognition result, is input via voice.

The data area stores data generated according to use of the terminal. More specifically, the data area of the present invention stores data used or generated while a voice command setting program and a voice recognition operation program are executed. For example, the data area may store voice commands by executable user functions, addable or substitutable words, a priority of user functions, and a voice command display scheme. Voice commands may be stored as a command display map associated with a certain execution screen. The command display map is characterized that it includes output location information of corresponding voice commands by at least one function executed according to voice input on a predetermined user function execution screen. Further, the data area may store various statistic models for voice recognition associated with the voice recognition operation program 163 and a voice recognition result.

The controller 170 controls an overall operation of the terminal. Accordingly, the controller 170 controls operations associated with voice recognition by outputting an executable voice command. For example, while a voice recognition execution request is continuously received, the controller 170 controls the display unit 143 to add and display a voice command to a currently displayed user function execution screen. Further, the controller 170 control dissimilar voice commands are displayed on a user function execution screen using similarity test.

Figure 2:
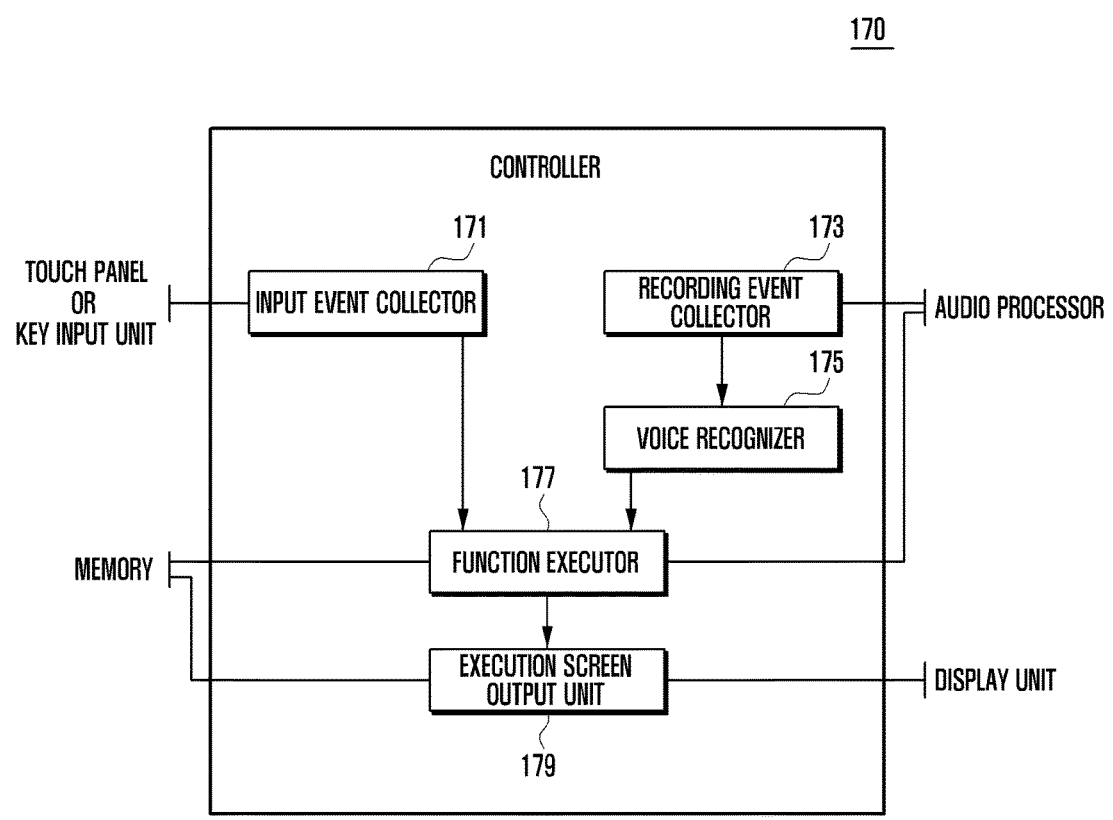
FIG. 2 is a block diagram illustrating a controller of a terminal according to an embodiment of the present invention.

FIG. 2 is a block diagram illustrating a controller of a terminal according to an embodiment of the present invention.

Referring to FIG. 2, the controller 170 includes an input event collector 171, a recording event collector 173, a voice recognizer 175, a function executor 177, and an execution screen output unit 179.

The input event collector 171 collects an input event generated from the touch panel 140 or the key input unit 120. More specifically, the input event collector 171 receives a voice recognition execution request. For example, the input event collector 171 collects a voice recognition touch event and/or a voice recognition touch event from the touch panel 140. Further, the input event collector 171 transfers received input events to the function executor 177.

The recording event collector 173 collects an audio event recorded from the audio processor 130. In particular, the recording event collector 173 receives a recording event in which a voice of the user, which is spoken in a voice recognition mode, is recorded. Such a recording event includes at least one spoken word. Further, the recording event collector 173 transfers the recording event to the voice recognizer 175.

The voice recognizer 175 recognizes a voice from the recording event to classify phonemes and to identify a word (or word string) constituting the phonemes. Particularly, the voice recognizer 175 accesses the memory 160 to determine whether a recording event includes a voice command displayed on a current execution screen. For example, the voice recognizer 175 performs voice recognition based on preset voice commands, e.g., voice commands displayed on a current execution screen. For example, when a voice is recognized as a phoneme unit, the voice recognizer 175 compares currently displayed phonemes of voice commands with a recognized phoneme.

When the currently displayed phonemes of voice commands differ from a recognized phoneme, the voice recognizer 175 may determine that a voice command is not input to reduce a voice recognition time. When the voice recognition is performed as a word unit, the embodiment of the present invention may provide the same advantage. When the currently displayed word of voice commands differ from a recognized word, the voice recognizer 175 may determine that a voice command is not input to reduce a voice recognition time.

In accordance with an embodiment of the present invention, diversity of recognizable voice input is suppressed in order to attempt rapid voice recognition. Further, in accordance with an embodiment of the present invention, a voice recognition service having high accuracy is provided by restricting a number of cases in which a voice is recognized as one of the displayed voice commands.

In addition, in accordance with an embodiment of the present invention, voice recognition is not consigned to an embedded engine based on a server, namely, an external server, but performs voice recognition in a terminal to provide rapid voice recognition.

When a word corresponding to one of the currently displayed voice commands is included in a recording event, the voice recognizer notifies the corresponding voice command to the function executor 177, which controls an overall operation of the terminal. When a voice recognition request is received from an input event collector 171, the function executor 177 changes a mode of the terminal to a voice recognition mode. The function executor 177 informs the audio processor 130 that a voice recognition mode starts in the voice recognition mode and controls the audio processor 130 to start voice recording. Thereafter, the function executor 177 controls a corresponding function to be executed according to a voice command received from the voice recognizer 175 and notifies the executed function to the execution screen output unit 179. When reception of the voice recognition request stops, the function executor 177 controls the audio processor 130 to stop the recording event. Accordingly, the voice recognizer 175 no longer executes the voice recognition. Additionally, the function executor 177 may control the voice recognizer 175 to terminate voice recognition.

The execution screen output unit 179 controls the display unit 143 to output a corresponding execution screen as the user function is executed. The user function execution screen may include at least one image component, e.g., an icon, a thumbnail, a character, etc. The image component may be associated with a certain function. Accordingly, when an event selecting a certain image component from the touch screen 140 or the key input unit 120 is generated, the controller 170 controls a function associated with the certain image component to be executed.

More specifically, the execution screen output unit 179 supports a preset voice command to be additionally output to a currently displayed user function execution screen in a voice recognition mode. The execution screen output unit 179 may access the memory 160 to confirm an executable user function on a current execution screen and a voice command for executing the user function.

The execution screen output unit 179 may control the display unit 143 to additionally display the confirmed voice command on an execution screen. The execution screen output unit 179 displays a voice command according to a preset scheme. Further, the execution screen output unit 179 may detect a display location of voice commands with reference to a command display map.

Figure 3:
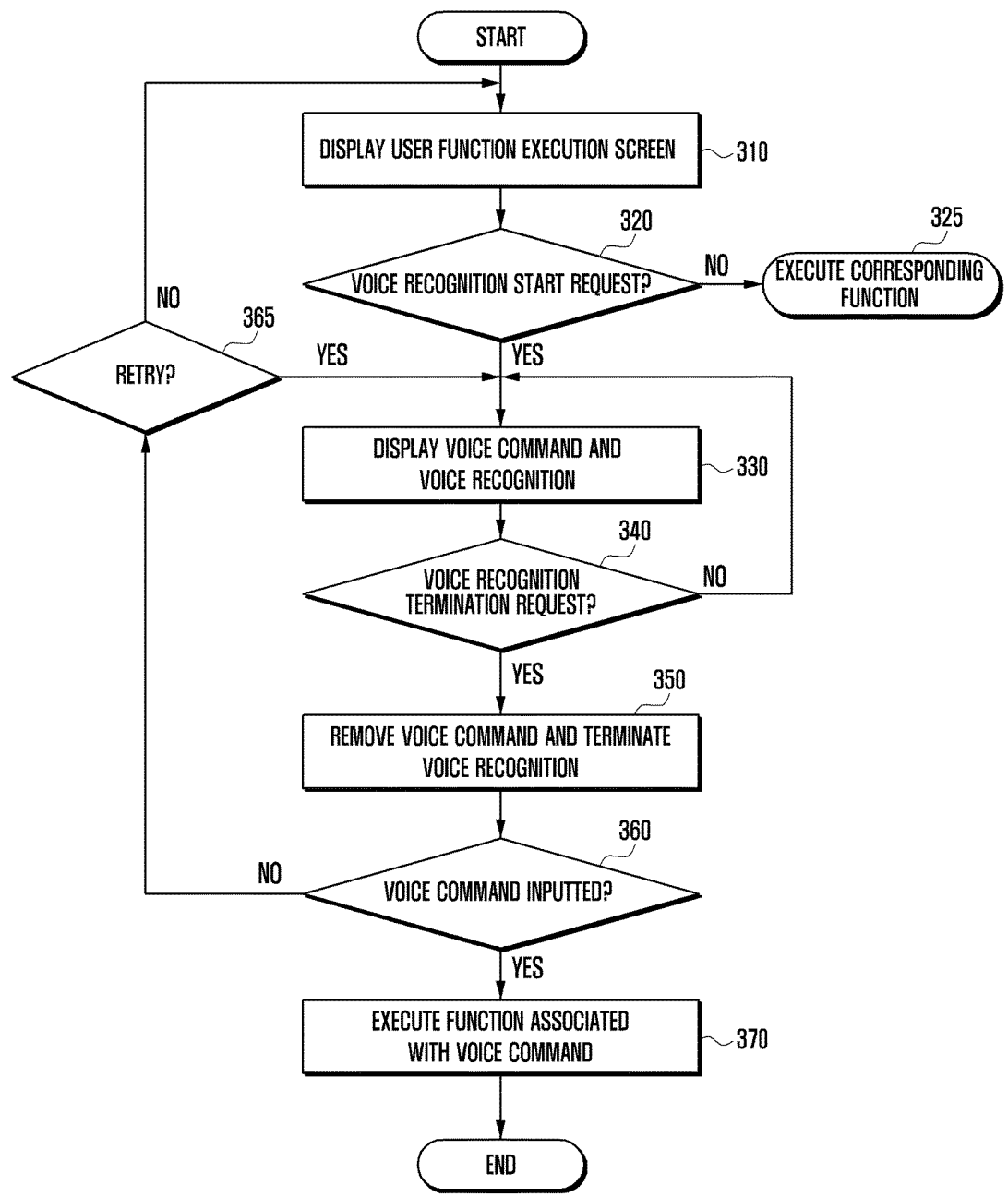
FIG. 3 is a flowchart illustrating a method for executing a user function using voice recognition according to an embodiment of the present invention.

FIG. 3 is a flowchart illustrating a method for executing a user function using voice recognition according to an embodiment of the present invention.

Referring to FIG. 3, in step 310, the controller 170 controls the display unit 143 to display a user function execution screen. As described above, the user function execution screen may include image components, such as icons, thumbnails, characters, etc., where each image component is associated with a certain function. Accordingly, when an event selecting the certain image component is generated from a touch screen 140 or a key input unit 120, the controller 170 controls a function associated with the certain image component to be executed.

Further, the controller 170 may determine voice commands associated with the execution screen in step 310. In this case, the controller 170 identifies functions executed on the execution screen according to voice input, and detects voice commands associated with the identified functions from registered voice commands. Accordingly, in accordance with an embodiment of the present invention, an automatic search is performed for extracting voice commands associated with the execution screen from the registered voice commands. As a result, the controller 170 may significantly reduce a time for searching for a specific voice command among all of the registered voice commands. Further, the controller 170 may dynamically perform a procedure of determining voice commands each time the execution screen is switched.

Further, each time a partial function of the execution screen is changed or added, the controller 170 may perform a procedure of determining voice commands. In this case, the controller 170 may search for voice commands associated with a changed or added function among the registered voice commands.

Additionally, the controller 170 may register a voice command when it is switched to a displayed execution screen in step 310. The controller 170 identifies functions executed on the execution screen according to voice input. The functions may be executed according a certain input event while the execution screen is being output or functions of a certain application. The functions executed on the execution screen according to voice input may be set by a designer or a user. Thereafter, the controller 170 identifies corresponding voice commands of functions executed according to voice input. Voice commands may be previously set by the designer or be automatically set by the controller 170. Further, the controller 170 can set a voice command according to a user input.

The controller 170 may also perform similarity test with respect to identified voice commands. The similarity test is performed to extract voice commands whose pronunciation or spelling are similar from designated voice commands.

Further, the controller 170 can modify at least one of voice commands extracted voice commands whose pronunciation or spelling are similar from designated voice commands by the test result.

Accordingly, the controller may prevent an occurrence of an inaccurate voice recognition result due to use of similar voice commands. When the similar voice commands are changed, the controller 170 may substitute a voice command for a change target by the other or add a word in front of or behind the voice command for the change target. In this case, a voice command to be changed may be selected according to a predetermine priority. For example, the priority may be determined in the order of a user function (e.g., help and search function) associated with an OS, an in-house application developed by a designer of a terminal, and a third party application downloaded and installed from the outside. For example, when a certain function of the in-house application and a function of the third party application have the same voice command, the voice command of the function of the third party application may be changed.

Alternatively, the controller 170 may refrain from performing the similarity test.

When the voice command is registered, the controller 170 registers a corresponding voice command associated with executable functions with voice input. Further, the controller 170 may register voice commands associated with a certain execution screen. Accordingly, when determining voice commands to be displayed on a user function execution screen, the controller 170 may search for registered voice commands that are associated with the user function execution screen. Accordingly, the controller 170 may rapidly determine important voice commands for the user function execution screen among a large number of registered voice commands.

The controller 170 may registering a voice command before displaying the voice command. Further, the controller 170 registering the voice command separately from executing the user function.

In step 320, the controller 170 senses a voice recognition start request during displaying an execution screen. Here, the controller 170 determines whether a voice recognition execution request is received from a touch panel 140 or a key input unit 120. For example, the controller 170 may receive a voice recognition touch event from the touch panel 140 or a voice recognition key input event of a voice recognition function key from a key input unit 120. The voice recognition touch event may be a touch event with respect to a certain image component constructing a currently output user function execution screen. When the voice recognition execution request is not sensed, the controller 170 executes a corresponding function according to an input signal in step 325.

When the voice recognition execution request is sensed, the controller 170 switches the terminal to a voice recognition mode in step 330. Further, the controller 170 outputs at least one voice command to a display unit 143 and controls a voice selected by the MIC to be recognized. For example, the controller 170 recognizes voice data collected based on voice commands associated with the execution screen in step 310.

As described above, in accordance with an embodiment of the present invention, a voice command is displayed to prevent words other than the displayed voice command from being input. Accordingly, in accordance with an embodiment of the present invention data processing for voice recognition is minimized. In addition, in accordance with an embodiment of the present invention voice recognition is restricted to certain voice commands in order to provide an exact and rapid voice recognition service.

More specifically, the controller 170 confirms at least one function executed according to voice input. The functions are various functions, which may be executed by a predetermined touch event or a key input event, and may be previously set. Certain executable functions by the touch event or the key input event may be set to be executed according to voice input, according to an intention of a designer or preference of a user. Further, the controller 170 may control functions of a certain application to be executed in a voice recognition mode.

When a voice recognition touch event is received, the controller 170 output functions of an application associated with a touched image component. In addition, the controller 170 may determine voice commands of a function executed according to confirmed voice input. As described above, the controller 170 may previously determine voice commands in step 310. Therefore, a voice command determining procedure in step 330 may be omitted. A corresponding voice command of each function is automatically generated or may be set by a designer or a user.

The controller 170 selects display locations of the determined voice commands. For example, the controller 170 may control a voice command to be displayed around an image component of an execution screen or a blanket of the execution screen.

More specifically, the controller 170 may control the display unit 143 to display a certain icon, e.g., a voice command "Calendar" within a predetermined distance of an area in which a calendar icon is displayed on a home screen. Further, the controller 170 may control a voice command "Help" to be displayed on any part of a blanket of an execution screen.

When determining a display location of a voice command, if there is an image component associated with a function related to the voice command, the controller 170 may select a voice command component around the image component. In this case, the controller 170 may determine whether there is the image component with reference to a map of the execution screen. Further, the controller 170 may select a voice command display location with reference to the map of the execution screen.

When there is no image component associated with a voice command to be displayed, the controller 170 may identify a blank area with reference to the map of the execution screen and display a voice command in the blank area. For example, when a function is executed according to a touch event, but there is no related image component, the controller 170 may control a voice command to be displayed at a location associated with the touch event. For example, when a function is set to be executed by a touch event starting from a certain location, the controller 170 may control a corresponding voice command to be output in the certain location of the execution screen.

When the function is set to be executed by a touch event having a certain direction, the controller 170 may control a corresponding voice command to be output to a side of the certain direction on the execution screen. Further, when a function executed by the key input unit 120 is set to be executed according to voice input, the controller 170 may control the display unit 143 to display a corresponding voice command around a mounted location of the key input unit 120.

As described above, after selecting display locations of voice commands, the controller 170 may generate a command display map. For example, the command display map includes output location information of voice commands displayed on a predetermined user function execution screen.

When there is a command display map corresponding a currently output user function execution screen, the controller 170 may control voice commands to be displayed with reference to the command display map in step 330.

In addition, the controller 170 may control a voice command to be output according to a preset display scheme. For example, the controller 170 may control a voice command to be overlaid and displayed on an execution screen in the form of a tool-tip or a speech bubble When there is an image component associated with the voice command, the controller 170 may remove an image component or a character indicating the image component and control a voice command to be output on a region from which the image component was removed. When a plurality of voice commands are output by associating a plurality of functions with one image component, the controller 170 may control voice commands to be displayed in a list. In addition, the controller 170 may combine voice commands to control the display unit 143 to display one pop-up window or a separate screen. It can be commonly apprehended by those skilled in the art that the voice command may be displayed in a combination of the foregoing display schemes.

In step 340, the controller 170 determines whether reception of the voice recognition execution request stops. When a key signal of a voice recognition function key is no longer received, i.e., when a voice recognition function key is released, or a voice recognition touch event is no longer received from the touch panel 140, the controller 170 determines that a termination request in a voice recognition mode is sensed.

Accordingly, in accordance with an embodiment of the present invention, a voice recognition function is executed while continuing a voice function key input or touch input with respect to a certain image component. Accordingly, a terminal in accordance with an embodiment of the present invention clearly identifies a start and termination of a voice recognition mode, thereby minimizing a voice recording time. In addition, in accordance with an embodiment of the present invention, a size of recorded voice data is minimized, which increases the speed of the voice recognition.

If no voice is input for a predetermined time, the controller 170 may identify a silence period and determine that a voice input period has expired. Accordingly, the controller 170 may determine whether termination of voice recognition is requested in step 340. In this case, when a silence period is recorded for a preset time, after a recording start time is confirmed, the controller 170 may automatically terminate the voice recognition.

When the voice recognition termination is not requested in step 340, the method returns to step 330, where the controller 170 continuously displays a voice command to perform voice recognition.

When the voice recognition termination is requested in step 340, the controller 170 removes a display of a voice command and terminates a voice recognition function, thereby terminating the voice recognition mode in step 350.

In step 360, the controller 170 determines whether a voice command is input. That is, the controller 170 confirms a voice recognition result to determine whether one of displayed voice commands is input. When it is determined that a predetermined voice command is input, the controller 170 executes a function associated with an input voice command in step 370.

As described above, a user speaks one of the voice commands, which are displayed on the display unit 143, to conveniently use various functions associated with the voice commands, without a separate touch operation or a key input operation.

When a voice command is not input in step 360, the controller 170 determines whether voice input is to be retried in step 365. For example, the controller 170 may check if the user wants to retry a voice input through a pop-up window. When the user wants to retry voice input through a predetermined user response in step 365, the method returns to step 330. However, when the user does not want to retry voice input in step 365, the method returns to step 310.

Alternatively, step 365 may be omitted. In this case, when the voice command is not input in step 360, the controller 170 terminates the method.

Figure 4:
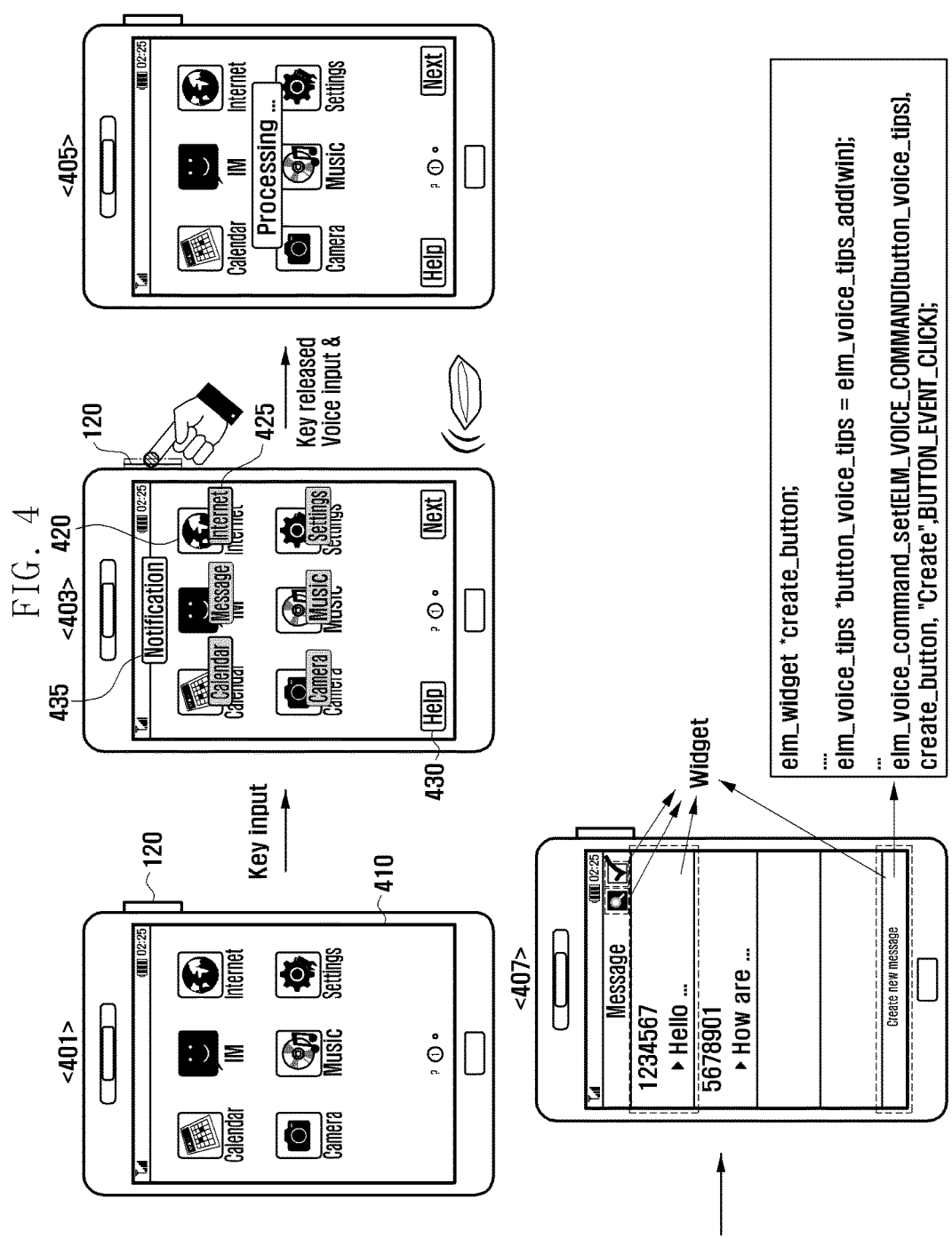
FIG. 4 illustrates examples of screens that are displayed when executing a user function using voice recognition according to an embodiment of the present invention.

FIG. 4 illustrates examples of screens that are displayed when executing a user function using voice recognition according to an embodiment of the present invention.

Referring to FIG. 4, as illustrated in screen 401, the terminal includes a voice recognition function key 120 and outputs a home screen 410. In FIG. 4, it is assumed that all of the functions executed by the function keys or the touch events can be executed by voice input, when the home screen 410 is displayed.

When the voice recognition function key 120 is pushed by the user, the controller 170 senses a voice recognition execution request. The controller 170 confirms functions executed by voice input, as illustrated in screen 403, to output voice command displays 425, 430, and 435 for the functions on the home screen 410. In addition, the controller 170 limits a voice recognition function to the displayed voice commands.

More specifically, the controller 170 confirms that an Internet browser application execution function is executed by voice input when the voice command 425 is displayed to determine that a corresponding voice command of the function is "Internet". Further, the controller 170 confirms that there is an image component associated with the function, namely, an Internet browser icon 420, and outputs an "Internet" 425 around the Internet browser icon 420.

Further, the controller 170 confirms that a voice command for an alarm center display function is displayed as a "Notification" 435. When a drag touch event occurs from an upper end of the home screen 410 in the downward direction, an alarm center display function is performed. The controller 170 confirms there is no image component associated with an alarm center display function with reference to a map of the home screen 410, and controls the display unit 143 to display "Notification" 435 in an upper blanket of the home screen 410, reflecting a start location of the touch event.

Further, a help search function is executed regardless of a touch location, when a drag touch event to the left side occurs. For this help function, the controller 170 displays a voice command of a help search function on a left side of the home screen 410 with "Help" 430.

When there is a command display map associated with the home screen, the controller 170 controls the display unit 143 to output voice commands according to a command display map.

According to another embodiment of the present invention, a help function may be supported on an execution screen. Further, the help function may be omitted from an execution screen in a voice recognition mode, and executable functions may be additionally displayed on a current execution screen. For example, additionally displayed functions through the help function may be a system reserved command, a parameter range of a command, or a using method relation command. Accordingly, when the user speaks "Help", the controller 170 may display preset commands in a pop-up window.

When the user releases the voice recognition function key 120, the controller 170 removes voice command displays from the home screen, as illustrated in screen 405, and terminates the voice recognition mode.

Additionally, the controller 170 may display a message informing an execution state of the voice recognition function. When voice input of "Message" is received through voice recognition, the controller 170 supports a message application to be executed, as illustrated in screen 407.

According to an embodiment of the present invention, a function executed by a voice command may be a widget, e.g., a 'search', 'check', 'message reading', or 'message creation' widget. The controller 170 may execute source code, as illustrated in screen 407, to register a voice command for the 'message creation' widget by way of example. Accordingly, a developer of an application providing an execution screen may add a voice command using a source code as illustrated in screen 407.

Although the voice recognition mode described above may be executed on a home screen 410, by way of example, the above-described embodiments of the present invention are not limited thereto and may be implemented on different screen, e.g., a message execution screen, as illustrated in screen 407.

In this case, a voice command display for an edit function of a message application, a new message creation function, and a search function may be additionally output to a message execution screen.

Figure 5:
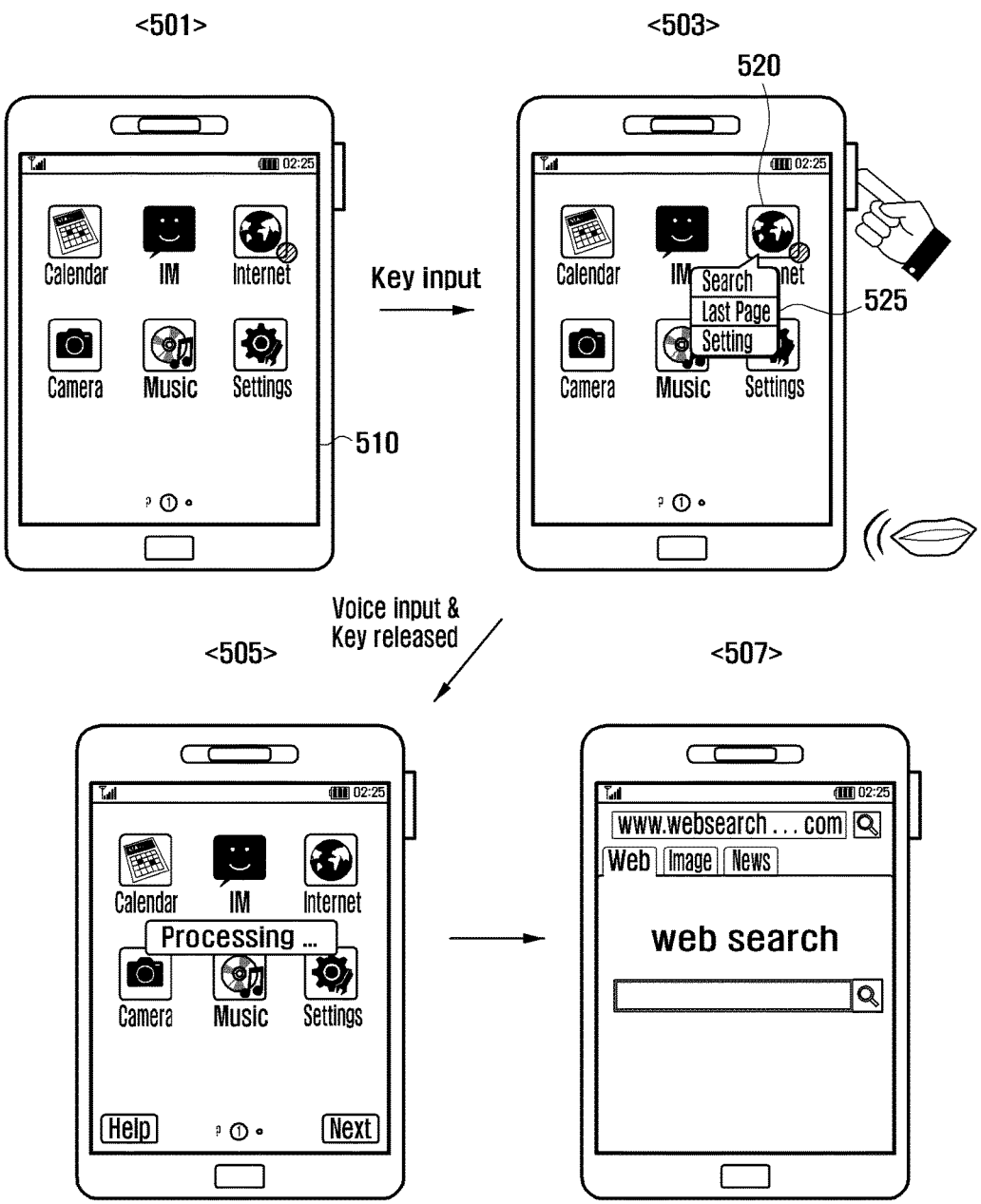
FIG. 5 illustrates examples of screens that are displayed when executing a user function using voice recognition according to an embodiment of the present invention.

FIG. 5 illustrates examples of screens that are displayed when executing a user function using voice recognition according to another embodiment of the present invention Referring to FIG. 5, a terminal includes a touch screen 140 and outputs a home screen 510. Further, as shown by the finger print on the home screen 510, the user touches an Internet browser icon 520 through a touch screen 140 as a touch object. When the touch continues for greater than a preset time, the controller 170 determines that a voice recognition execution request is sensed. The controller 170 confirms preset functions of an Internet browser application associated with a touched Internet icon 450. The controller 170 identifies voice commands of the application functions and controls the display unit 143 to output display 525 of corresponding voice commands, as illustrated in screen 503, around the icon 520. In addition, the controller 170 limits voice recognition functions to the displayed voice commands.

In this case, the controller 170 confirms whether there is an image component associated with an Internet browser application, namely, an icon 520 with reference to a map of the home screen 510. Further, the controller 170 displays the voice commands of the application functions around the Internet browser icon 520.

In particular, because a plurality of voice commands are displayed around an image component, the controller 170 may control the display unit 143 to display a plurality of voice commands as a list. In addition, when a voice recognition execution request is sensed, the controller 170 drives a MIC to record a voice of the user, such that voice recognition is executed.

When the user releases contact of a touch panel 140 on a touch object, the controller 170 removes a voice command display 525, as illustrated in screen 505, and terminates voice recognition.

When it is determined that a voice command "Search" is spoken according to a voice recognition result, the controller 170 executes a function on which a web search page is output on a web browser, as illustrated in screen 507.

Figure 6:
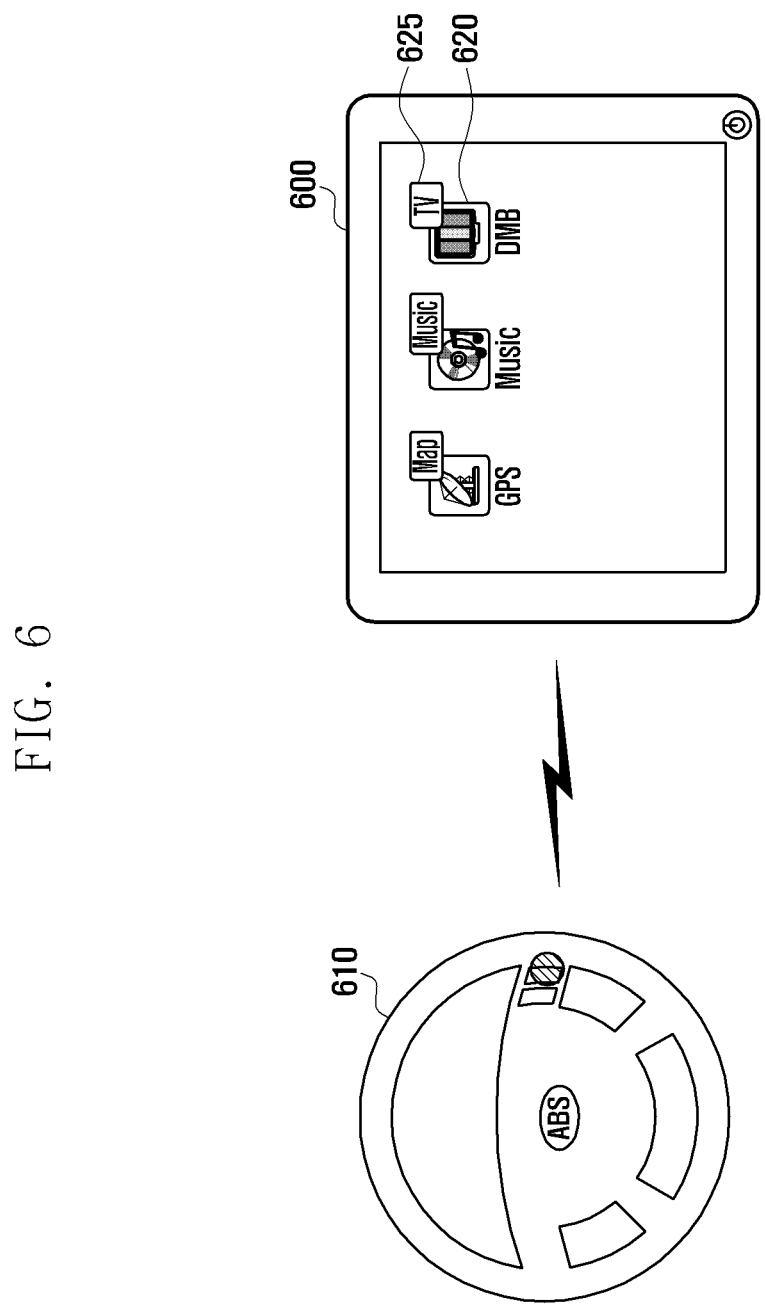
FIG. 6 illustrates an example of a screen that is displayed when executing a user function using voice recognition in a vehicle operation system according to an embodiment of the present invention.

FIG. 6 illustrates an example of a screen that is displayed when executing a user function using voice recognition in a vehicle operation system according to an embodiment of the present invention.

Referring to FIG. 6, when a vehicle navigation device 600 outputs a menu screen, a voice recognition execution request may be received through an input unit mounted on a vehicle steering wheel 610. In this case, the voice recognition execution request may be transmitted from the vehicle steering wheel 610 to a vehicle navigation device 600 through wireless communication. The vehicle navigation device 600 identifies executable functions, e.g., a Global Positioning Satellite (GPS) function, a music playback function, a Digital Multimedia Broadcasting (DMB) viewing function, e.g., and starts a voice recognition function. The vehicle navigation device 600 may check voice commands by functions to display the voice commands on a menu screen. For example, in FIG. 6, the vehicle navigation device 600 overlays and displays "TV" 625 as a voice command of a DMB function around a DMB icon 620. If the input of the input unit of the vehicle steering wheel 610 is terminated, i.e., the button is released, the vehicle navigation device 600 determines that a voice command is input through voice recognition and executes a corresponding function.

Figure 7:
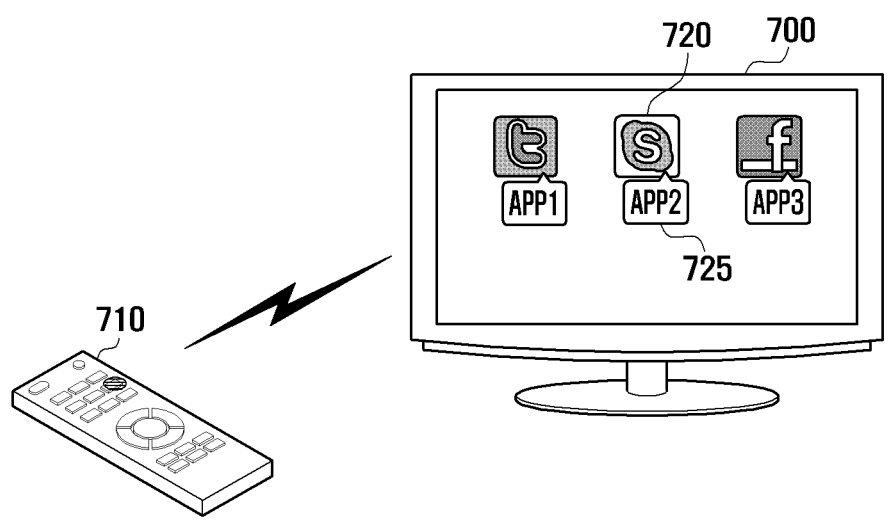
FIG. 7 illustrates an example of a screen that is displayed when executing a user function using voice recognition in a television system according to an embodiment of the present invention.

FIG. 7 illustrates an example of a screen that is displayed when executing a user function using voice recognition in a television system according to an embodiment of the present invention.

Referring to FIG. 7, a television system includes a television 700 that displays a menu screen and a remote controller 710. When a key that is set to execute a voice recognition function on the remote controller 710 is input, the television 700 displays voice commands of executable functions and executes the voice recognition function. For example, in FIG. 7, the television 700 displays "Call" 725 as a voice command for an application execution function around icon 720 for application 2.

Figure 8:
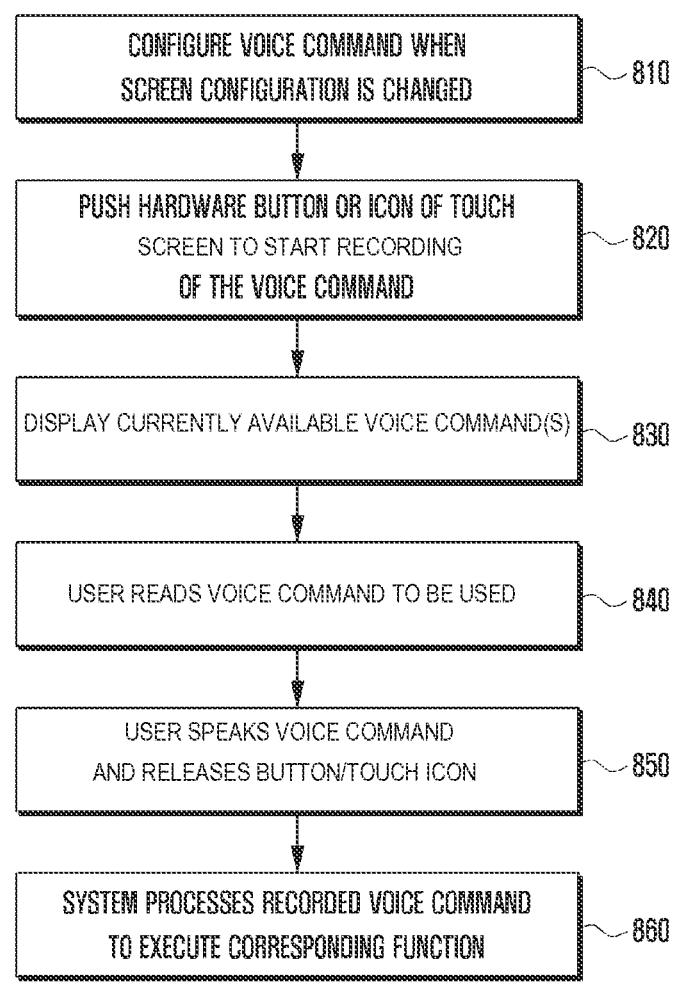
FIG. 8 is a flowchart illustrating a voice command according to an embodiment of the present invention.

FIG. 8 is a flowchart illustrating a procedure of using a voice command according to an embodiment of the present invention.

Referring to FIG. 8, a voice recognition system configures a voice command, when a screen configuration is changed in step 810. In this case, the voice recognition system first confirms executable components in a current screen state. Here, the components may be a widget displayed on a current execution screen or an object generating an executable event during selection input. Further, the voice recognition system extracts components in which the voice command is not registered from the components and optionally allocates a voice command to the extracted components. The voice recognition system then may confirm voice commands associated with the components among a plurality of registered voice commands. Accordingly, the voice recognition system significantly reduces a configuration time of a voice command.

When allocating the voice command, the voice recognition system may allocate commands whose defined similarity is low to increase the accuracy of the voice recognition.

Further, when it is determined that a procedure of configuring a voice command is terminated, the voice recognition system may perform similarity test with voice commands. Here, the similarity test is performed to identify voice command whose pronunciation or spelling is similar to previously designated voice commands. The voice recognition system may then change at least one of the similar voice commands.

Accordingly, the voice recognition system may prevent the occurrence of an inaccurate voice recognition result, due to use of similar voice commands.

When the similar voice commands are changed, the voice recognition system may substitute a voice command for a change target with another voice command or may add a word in front of or after the voice command targeted for change. Through the similarity test, the voice recognition system may reconfigure voice commands to reduce similarity between the voice commands.

As described above, the voice recognition system configures voice commands during a switch of a screen to wait for a voice recognition mode start request.

Figure 9:
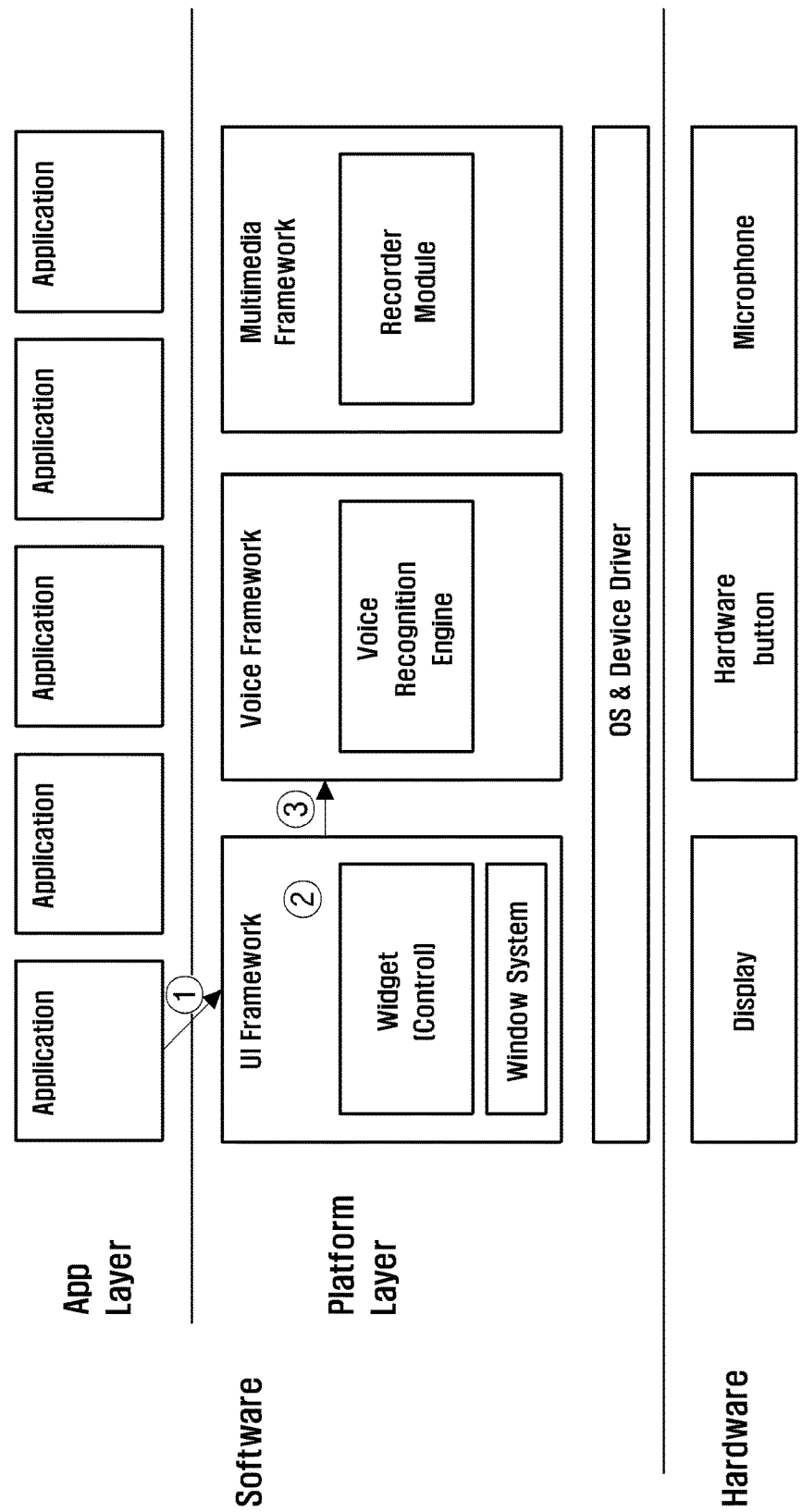
FIGS. 9 to 11 illustrate a voice recognition system according to an embodiment of the present invention.

FIG. 9 illustrates a voice recognition system according to an embodiment of the present invention.

Referring to FIG. 9, User Interface (UI) framework in a platform layer of software in the voice recognition system is arranged by collecting a widget or an object necessary when configuring a screen to be switched from a certain application of an application layer in a first step. Thereafter, the UI framework extracts a previously defined voice command with respect to the collected widget or object in the second step by a developer. Here, the UI framework may be automatically searched by searching for the voice commands associated with each widget and object, among all of the registered voice commands.

The UI framework may request a voice command with respect to a widget or an object in which a voice command is not determined to a voice frame of a platform layer. When the voice command is designated in each collected widget or object, the UI framework may determine voice commands associated with each widget or object in the third step as a candidate voice command, in which voice recognition is possible while a screen to be switched is displayed. Here, the candidate voice command is a voice command to be displayed on a screen to be switched in a voice recognition mode.

Accordingly, each time a displayed screen is changed, voice commands associated with the screen may be converted into a candidate recognition target to be searched by the UI framework. Further, the UI framework transfers a candidate voice command group to the voice framework. In response, the voice frame transfers voice commands to a voice recognition engine so that voice recognition may be prepared to be started.

Accordingly, the voice recognition system illustrated in FIG. 9 limits the number of cases in which voice is recognized to a number of candidate voice commands to provide quicker and more precise voice recognition service.

Referring back to FIG. 8, in step 820, the user presses a hardware button 120 or an icon of a touch screen 140 to start recording of the voice command.

In step 830, the voice recognition system displays an available voice command, i.e., a voice command configured in step 810.

Accordingly, the user may confirm voice commands of executable hardware or software components in a current state of the terminal.

Further, the voice recognition system displays a voice command around a corresponding component. For example, the voice command for a hardware component is displayed adjacent to a mounted location of the hardware component on the display unit 143, and the software component may be output adjacent to the software component displayed on the display unit 143. In addition, the voice recognition system starts recording for voice recognition, when the hardware button 120 or an icon of the touch screen 140 is pushed by the user.

While the hardware button 120 or the icon of the touch screen 140 is being pushed, the user reads a voice command to be output and used on the touch screen 140, in step 840. In step 850, the user speaks the voice command and then releases the hardware button 120 or the icon of the touch screen 140. In step 860, the voice recognition system processes a recorded voice command to execute a corresponding function.

More specifically, the voice recognition system recognizes a recorded voice, while the user is pushing the hardware button 120 or the icon of the touch screen 140, and executes a preset function of a hardware or software component associated with the recognized voice command.

Figure 10:
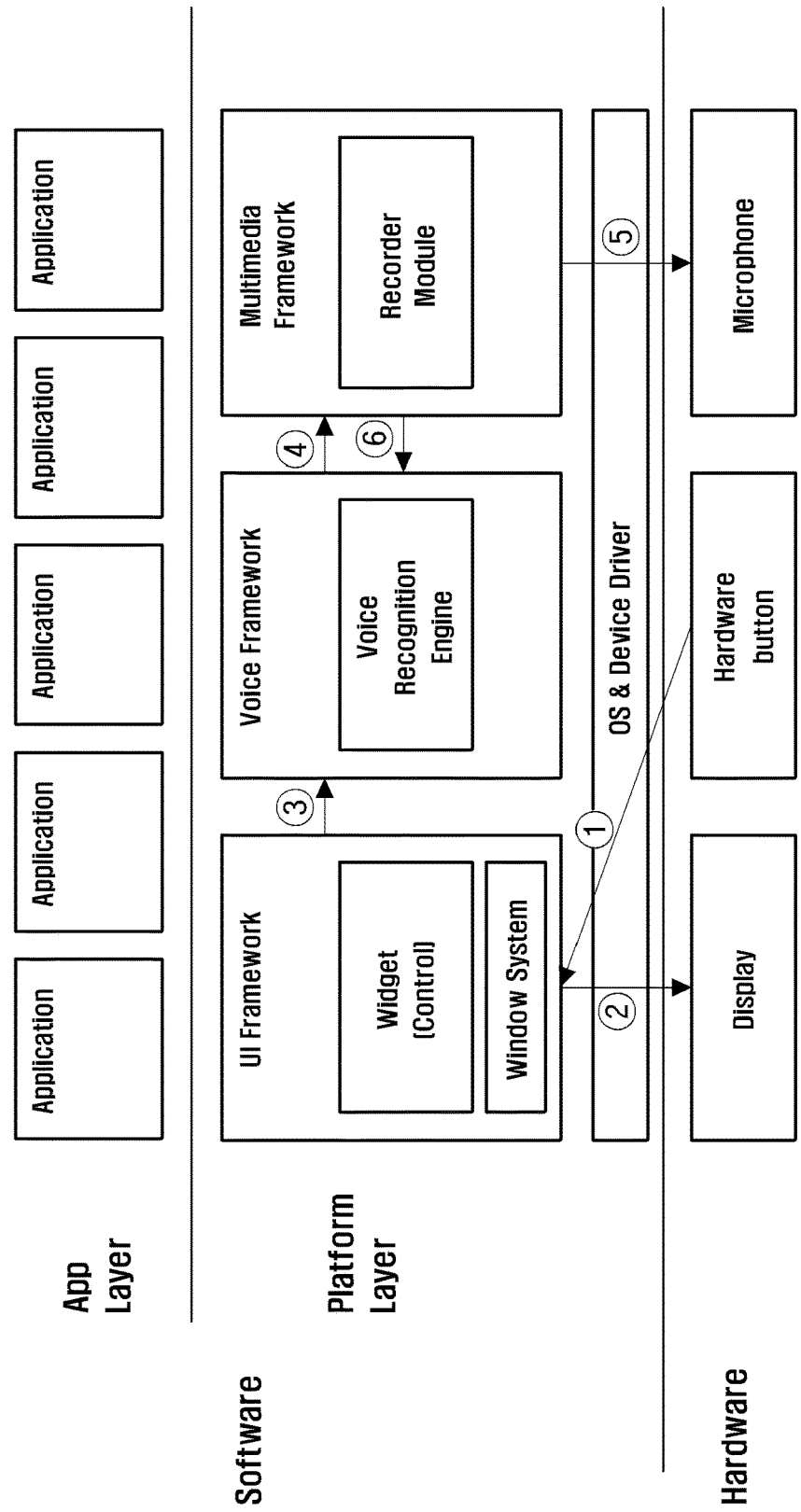

FIG. 10 illustrates a voice recognition system according to an embodiment of the present invention.

Referring to FIG. 10, when the user pushes the hardware button 120 or the icon of the touch screen 140, the voice recognition system informs a UI framework of input of the user through an OS of a software platform layer and a device driver in a first step. In response, the UI framework collects the voice commands associated with a displayed execution screen, from among all of the voice commands registered in the voice recognition system in the second step, identifies output locations of the collected voice commands, reconfigures an execution screen, and outputs the reconfigured execution screen on the display unit 143. The voice recognition system may reconfigure an execution screen such that a voice command is displayed according to the foregoing display scheme.

After the voice command is output, the UI framework requests voice recognition to a voice framework in a third step. In a fourth step, the voice framework requests recording start to a multimedia framework such that a voice recognition engine may receive voice recording data.

Accordingly, the multimedia framework activates a MIC to collect voice and generate recording data in a fifth step. The multimedia framework transfers voice data recorded through the MIC to the voice framework in a sixth step. The voice framework transfers the received voice data to the voice recognition engine. Further, the voice recognition engine analyzes the recorded voice data to perform voice recognition. Accordingly, the user pushes the hardware button 120 or the icon of the touch screen 140 for the voice recognition system to perform voice recognition as previously illustrated.

Figure 11:
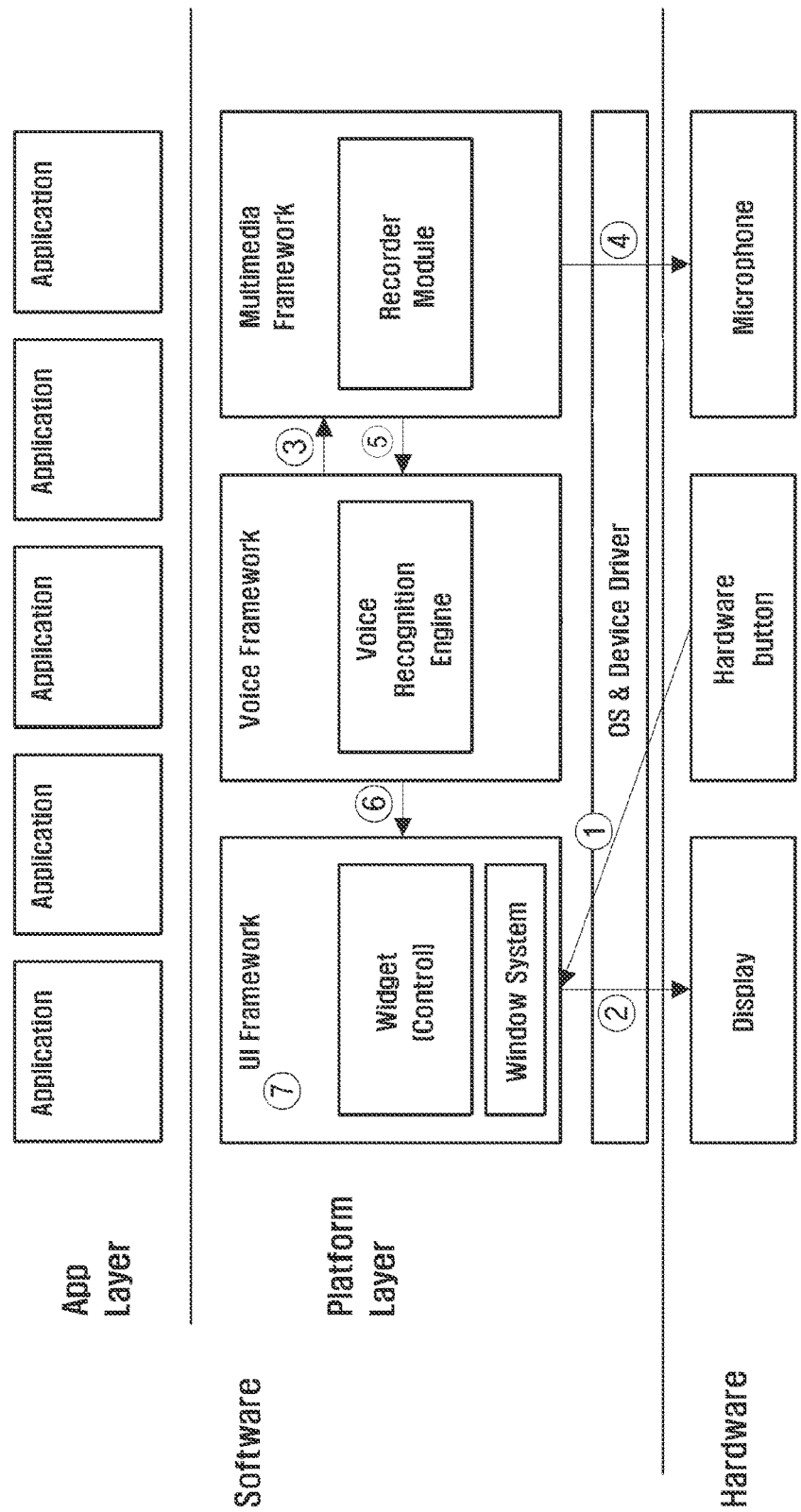

FIG. 11 illustrates a voice recognition system according to an embodiment of the present invention.

Referring to FIG. 11, while performing voice recognition, when the user releases the hardware button 120 or the icon of the touch screen 140, the UI framework is informed of the release through the OS and a device driver in a first step. In response, the UI framework requests a voice recognition termination from the voice framework and controls the display unit 143 to output an execution screen from which the voice command is removed in a second step.

The voice framework having received a voice recognition termination request requests a recording termination to a multimedia framework in a third step.

Accordingly, the multimedia framework inactivates the MIC in a fourth step, and transfers final recorded voice data to the voice framework in a fifth step to terminate recording. The voice recognition engine transfers a voice recognition result including final voice data to the voice framework.

In a sixth step, the voice framework transfers the voice recognition result to the UI framework.

When the voice recognition result is appropriate in a seventh step, that is, when the voice recognition result accords with one of output voice commands, the UI framework supports such that an event of a widget or an object corresponding to the recognized voice command is executed.

The voice recognition system may execute voice recognition although a user does not continuously push a hardware button 120 or an icon of a touch screen 140. For example, when the user temporarily pushes and then separates the hardware button 120 or an icon of a touch screen 140, the voice recognition system may start voice recording.

Further, when it is determined that a voice is not input for a preset time, the voice recognition system may terminate the voice recording.

A method and an apparatus are provided for recognizing a controlled voice to execute a user function that is displayed with at least one voice command indicating executable functions. Accordingly, an embodiment of the present invention instructs the user to speak one of displayed voice commands. Further, the present invention displays dissimilar voice commands to induce voice input securing high accuracy of voice recognition.

Accordingly, an embodiment of the present invention guides voice input of the user, such that voice recognition with respect to voice input quicker and more accurate, based on a displayed voice command, and prevents undesirable functions of the user from being executed.

As described above, in a method and an apparatus for recognizing a controlled voice to execute a user function according to an embodiment of the present invention, voice commands for executing user functions are displayed to guide voice input of the user, thereby improving voice recognition.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method for executing a function by an electronic device using voice recognition, the method comprising:
identifying a plurality of executable functions that are activatable by a voice input and a voice command corresponding to each of the plurality of executable functions from among registered commands;
while a voice recognition execution key input or a voice recognition touch input is continuously received by a held key input or touch input, displaying the identified voice command corresponding to each of the plurality of executable functions and receiving the voice input;
determining whether the received voice input corresponds to at least one of the displayed voice command and removing the identified voice command corresponding to each of the plurality of executable functions from the display, when the voice recognition key input or the voice recognition touch input is no longer received; and
performing the executable function associated with the voice input, when the received voice input corresponds to at least one of the displayed voice command,
wherein the voice recognition is limited to the displayed voice commands.

2. The method of claim 1, wherein the voice command is displayed around an image component displayed on a screen or in a blank area of the screen.

3. The method of claim 1, wherein the voice command is displayed around an icon associated with the executable function corresponding to the identified voice command.

4. The method of claim 1, wherein the voice command is displayed around a mounted location of a key input unit receiving a key input, when a function executed according to the voice input is a function executed by the key input.

5. The method of claim 1, further comprises identifying, on a screen, an executable function for which a voice command for voice recognition is not registered, and allocating a voice command for voice recognition to the executable function for which the voice command for voice recognition is not registered.

6. The method of claim 1, wherein the function includes one of a function executed when a touch input and a key input are received, and a preset function of a certain application.

7. The method of claim 1, further comprising:
testing similarity of the identified voice commands; and
changing at least one of similar voice commands, according to a result of the testing, before displaying the voice command.

8. The method of claim 1, wherein removing the displayed voice command from an execution screen terminates the voice recognition.

9. An apparatus for executing a user function using voice recognition, the apparatus comprising:
a display unit;
an input that receives a voice recognition key input;
an touch panel that receives a voice recognition touch input;
an audio processor that collects and records voice input; and
a controller that:
identifies a plurality of executable functions that are activatable by the voice input and a voice command corresponding to each of the plurality of executable functions from among registered commands,
controls the display unit to display the identified voice command corresponding to the each of the plurality of executable functions and recognizes the voice input while a voice recognition execution key input or a voice recognition touch input is continuously received by a held key input or touch input,
determines whether the received voice input corresponds to at least one of the displayed voice command and removes the identified voice command corresponding to each of the plurality of executable functions from the display, when the voice recognition key input or the voice recognition touch input is no longer received, and
performs the executable function associated with the voice input, when the received voice input corresponds to at least one of the displayed voice command,
wherein the voice recognition is limited to the displayed voice commands.

10. The apparatus of claim 9, wherein the voice command is displayed around an image component displayed on a screen or in a blank area of screen.

11. The apparatus of claim 9, wherein the controller is further configured to identify, on a screen, an executable function for which a voice command for voice recognition is not registered, and allocate a voice command for voice recognition to the executable function for which the voice command for voice recognition is not registered.

12. The apparatus of claim 9, wherein the voice command is displayed on a side of a screen in a direction of a touch input received by the touch panel.

13. The apparatus of claim 9, wherein the voice command is displayed in a start location of a touch input received by the touch panel among a screen.

14. The apparatus of claim 9, wherein the voice command is displayed in a tool tip, a pop-up window, or a list form.

15. The apparatus of claim 9, wherein the controller identifies the function executed according to the voice input, calls a voice command display map including a display location of a voice command associated with a plurality of icons displayed on a screen, and controls the display unit to display corresponding voice commands on the screen.

16. The apparatus of claim 9, wherein the controller stores a display location of the voice command associated with a plurality of icons displayed on a screen.

17. The apparatus of claim 9, wherein the controller determines whether the voice input by the user is at least one of the displayed voice command.

18. The apparatus of claim 9, wherein the function executed according to the voice input includes one of a function executed according to a touch input for the user function, and a key input and a preset function of a certain application.

19. The apparatus of claim 9, wherein removing the displayed voice command terminates the voice recognition.

20. An apparatus comprising:
a display;
an audio input;
a memory; and
a controller that provides a voice recognition system in which:
an application layer has applications which provide one or more objects; and
a platform layer has a user interface framework which:
outputs a screen configured by the objects collected from the one or more applications in the application layer which are associated with the screen;
identifies a voice command associated with the each of the collected objects from among registered commands to determine any candidate currently available voice commands for displaying on the screen, transfers any found candidate currently available voice commands to a voice recognition engine, changes and searches voice commands associated with a displayed screen as a candidate recognition target each time a displayed screen is changed, and receives a voice input while a voice recognition key input or a voice recognition touch input is continuously received by a held key input or touch input, wherein the identified voice command corresponding to each of the plurality of collected objects are displayed while the voice recognition key input or the voice recognition touch input is continuously received by the held key input or touch input, and are removed from the display when the voice recognition key input or the voice recognition touch input is no longer received, wherein removing the identified voice command from the display terminates the voice recognition, and wherein the voice recognition is limited to the displayed voice commands.

21. The apparatus of claim 20, wherein the user interface framework reconfigures the screen to display any found candidate currently available voice commands.

22. The apparatus of claim 20, wherein the platform layer further comprises:

a multimedia framework which records a user voice with the audio input; and a voice framework having the voice recognition engine receiving recorded voice data from the multimedia framework, and determining whether the recorded voice data accords with at least one of any found candidate currently available voice commands.

23. A non-transitory computer-readable storage medium for storing a computer program of instructions configured to be readable by at least one processor for instructing the at least one processor to execute:

identifying a plurality of executable functions that are activatable by a voice input and a voice command corresponding to each of the plurality of executable functions from among registered commands;

while a voice recognition execution key input or a voice recognition touch input is continuously received by a held key input or touch input, displaying the identified voice command corresponding to the each of the plurality of executable functions and receiving the voice input;

determining whether the received voice input corresponds to at least one of the displayed voice command and removing the identified voice command corresponding to each of the plurality of executable functions from the display, when the voice recognition key input or the voice recognition touch input is no longer received;

performing the executable function associated with the voice input, when the received voice input corresponds to at least one of the displayed voice command, wherein removing the identified voice command from the display terminates the voice recognition, and wherein the voice recognition is limited to the displayed voice commands.

* * * * *